G. A. BARNES.
TOOL HOLDER.
APPLICATION FILED OCT. 13, 1908.
945,674.
Patented Jan. 4, 1910.
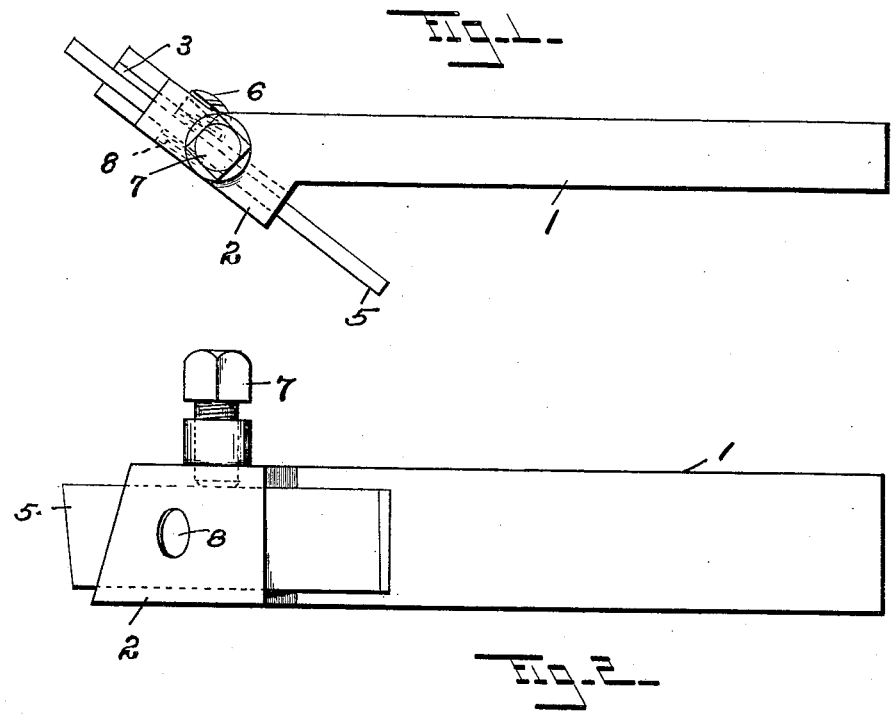
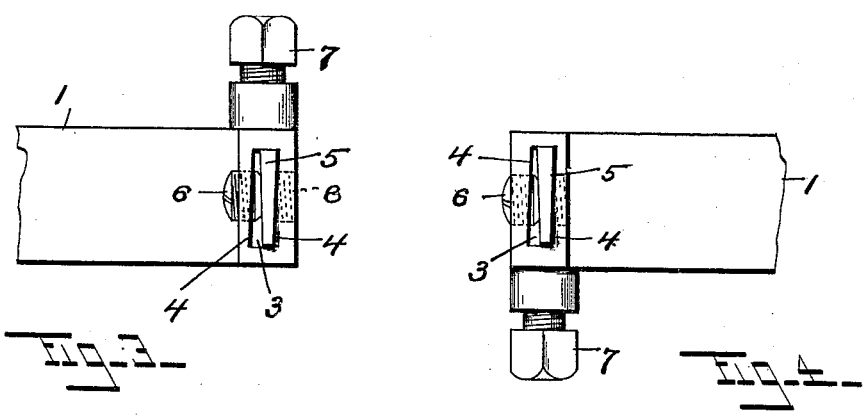
WITNESSES:
INVENTOR.
George A. Barnes
BY George E. Hall
ATTORNEY.

UNITED STATES PATENT OFFICE.

GEORGE A. BARNES, OF NEW HAVEN, CONNECTICUT, ASSIGNOR TO THE READY TOOL COMPANY, OF NEW HAVEN, CONNECTICUT, A CORPORATION OF CONNECTICUT.

TOOL-HOLDER.

945,674.  Specification of Letters Patent.  Patented Jan. 4, 1910.

Application filed October 13, 1908. Serial No. 457,463.

*To all whom it may concern:*

Be it known that I, GEORGE A. BARNES, a citizen of the United States, residing at New Haven, in the county of New Haven and State of Connecticut, have invented certain new and useful Improvements in Tool-Holders, of which the following is a specification, reference being had therein to the accompanying drawings.

My invention relates to new and useful improvements in tool holders, and has for its object, among other things, to provide a holder that will adjustably and rigidly hold a cutting tool therein for either a right or left hand operation, and one that can be produced at the minimum cost.

To these, and other ends, my invention consists in the tool holder, having certain details of construction and combinations of parts, as will be hereinafter described, and more particularly pointed out in the claims.

Referring to the drawings, in which like numerals of reference designate like parts in the several figures: Figure 1 is a plan view of my improved tool holder complete; Fig. 2 is a side elevation thereof; Fig. 3 is a front view of the tool holder when used for a right hand operation; and Fig. 4 is a similar view of the tool holder when used for a left hand operation.

In the practice of my invention I provide a body member 1 having a head member 2 at an angle thereto, and through which is an opening 3, the sides 4 of which are parallel with each other but at an angle with the sides of the head member. Mounted within the opening 3 is a cutter bar 5, the sides of which taper toward each other, from one edge to the opposite edge, so as to provide a clearance space during the cutting operation. The angle of the sides 4 in relation to the top and bottom of the body member 1 is the same as that of the sides of the cutter 5 with the top and bottom edges thereof, so that when the cutter is secured within the tool holder the clearance upon both sides thereof will be exactly equal. This cutter bar is held rigidly against the sides 4 by a screw 6 threaded through one side of the head member 2, the end of which impinges against the cutter bar, and against the bottom of the opening 3 by the screw 7, which is threaded through the head and bears upon the edge of the cutter bar. When used as a right hand tool the cutter is secured within the head member 2 in the position shown in Fig. 3, and when used as a left hand tool the cutter bar is inserted within the opening 3, as shown in Fig. 4, with the screw 6 threaded through the hole 8 in the head member 2.

There are minor changes and alterations that can be made within my invention, and I would therefore have it understood, that I do not limit myself to the exact construction herein shown and described, but claim all that falls fairly within the spirit and scope of my invention.

Having described my invention, what I claim as new, and desire to secure by Letters Patent, is:—

1. In a tool holder, the combination with the body member having an offset head at one end, and through which is an opening having parallel sides and ends, the said sides being at an angle to the two adjacent sides of the said head, and the ends substantially parallel with the adjacent sides of said head; of a cutter bar movable within said opening; and threaded means for holding said cutter bar against one side and one end of said opening, substantially as shown and described.

2. In a tool holder, the combination with the body member having an offset head at one end, and through which is an opening having parallel sides and ends, the said sides being at an angle to the two adjacent sides of the said head, and the ends substantially parallel with the adjacent sides of said head; of a cutter bar, the sides of which taper toward each other from one edge to the opposite edge; threaded means for engaging one of the tapered sides of said cutter bar whereby the same is held against one of the sides of said opening; and threaded means for engaging one edge of said cutter bar.

3. In a tool holder, the combination with a body member 1 having an offset head 2 integral therewith, and through which is an opening 3, the sides of which are parallel with each other but at an angle to the adjacent sides of the said head, and the ends of said opening substantially parallel with the adjacent sides of said head, said head having a threaded hole from each side of said head into said opening; a cutter bar 5, the sides of which taper toward each other from one edge to the opposite edge; a screw 6 adapted to be threaded into either of said holes in said head and engaging one side of said cutter bar; and a screw 7 also threaded through said head and engaging one edge of said cutter bar.

In testimony whereof I affix my signature in presence of two witnesses.

GEORGE A. BARNES.

Witnesses:
   GEORGE E. HALL,
   WALLACE S. MOYLE.